United States Patent [19]
Cullen et al.

[11] Patent Number: 5,855,113
[45] Date of Patent: Jan. 5, 1999

[54] METHOD AND SYSTEM FOR CONTROLLING THE TEMPERATURE OF AN EXHAUST SYSTEM HAVING A VARIABLE LENGTH EXHAUST PIPE

[75] Inventors: Michael John Cullen, Northville; Jeffrey Scott Hepburn, Dearborn, both of Mich.

[73] Assignee: Ford Global Technologies, Inc., Dearborn, Mich.

[21] Appl. No.: 829,515

[22] Filed: Mar. 28, 1997

[51] Int. Cl.⁶ ........................................ F01N 3/00
[52] U.S. Cl. ................... 60/274; 60/289; 60/290; 60/286; 364/557
[58] Field of Search .................... 60/274, 286, 288, 60/289, 290, 322; 364/557

[56] References Cited

U.S. PATENT DOCUMENTS

| | | | |
|---|---|---|---|
| 3,957,444 | 5/1976 | Goto et al. | 60/288 |
| 5,414,994 | 5/1995 | Cullen et al. | 60/274 |
| 5,606,855 | 3/1997 | Tomisawa . | |
| 5,610,844 | 3/1997 | Maus et al. | 364/557 |
| 5,613,359 | 3/1997 | Zahn et al. | 60/288 |
| 5,701,735 | 12/1997 | Kawaguchi | 60/286 |
| 5,722,236 | 3/1998 | Cullen et al. | 60/274 |

FOREIGN PATENT DOCUMENTS

| | | |
|---|---|---|
| 44 10 225 A1 | 9/1995 | Germany . |
| 195 22 165 A1 | 12/1995 | Germany . |
| WO 96/27734 | 9/1966 | WIPO . |

*Primary Examiner*—Thomas E. Denion
*Attorney, Agent, or Firm*—Allan J. Lippa; Roger L. May

[57] ABSTRACT

A method and system for controlling the temperature of an exhaust system having a variable length exhaust pipe including a short path and a long path and an exhaust valve positioned in the exhaust pipe for regulating the flow of exhaust gas between the short path and the long path utilizes control logic for estimating a plurality of exhaust temperatures at various locations on the exhaust system. A plurality of maximum temperatures are also determined. The plurality of estimated exhaust temperatures are then compared with the plurality of maximum temperatures, and if a preselected number of the plurality of exhaust temperatures exceed the plurality of maximum temperatures, the exhaust valve is controlled so that the exhaust gas flows through the long path of the exhaust pipe so as to aid in cooling the exhaust gas.

16 Claims, 4 Drawing Sheets

5,855,113

METHOD AND SYSTEM FOR CONTROLLING THE TEMPERATURE OF AN EXHAUST SYSTEM HAVING A VARIABLE LENGTH EXHAUST PIPE

DISCLOSURE OF THE INVENTION

It is thus a general object of the present invention to provide a method and system for controlling the temperature of an exhaust system having a variable length exhaust pipe by regulating the flow path of the exhaust gas.

In carrying out the above object and other objects, features, and advantages of the present invention, a method is provided for controlling the temperature of an exhaust system having a variable length exhaust pipe including a short path and a long path and having an exhaust valve positioned in the exhaust pipe for regulating the flow of exhaust gas between the short path and the long path. The method includes the steps of estimating a plurality of exhaust temperatures at various locations on the exhaust system and determining a plurality of maximum temperatures. Still further, the method includes the step of comparing the plurality of estimated exhaust temperatures with the plurality of maximum temperatures. Finally, the method includes the step of controlling the exhaust valve so that the exhaust gas flows through the long path of the exhaust pipe if a preselected number of the plurality of exhaust temperatures exceed the plurality of maximum temperatures.

In further carrying out the above object and other objects, features, and advantages of the present invention, a system is also provided for carrying out the steps of the above described method. The system includes control logic operative to estimate a plurality of exhaust temperatures at various locations on the exhaust system, determine a plurality of maximum temperatures, compare the plurality of estimated exhaust temperatures with the plurality of maximum temperatures, and to control the exhaust valve so that the exhaust gas flows through the long path of the exhaust pipe if a preselected number of the plurality of exhaust temperatures exceed the plurality of maximum temperatures.

An article of manufacture for an exhaust system of an internal combustion engine is also provided for carrying out the above object and other objects, features, and advantages of the present invention. The article of manufacture comprises a computer storage medium having a computer program encoded therein for estimating a plurality of exhaust temperatures at various locations on the exhaust system, determining a plurality of maximum temperatures, comparing the plurality of estimated exhaust temperatures with the plurality of maximum temperatures, and controlling the exhaust valve so that the exhaust gas flows through the long path of the exhaust pipe if a preselected number of the plurality of exhaust temperatures exceed the plurality of maximum temperatures.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
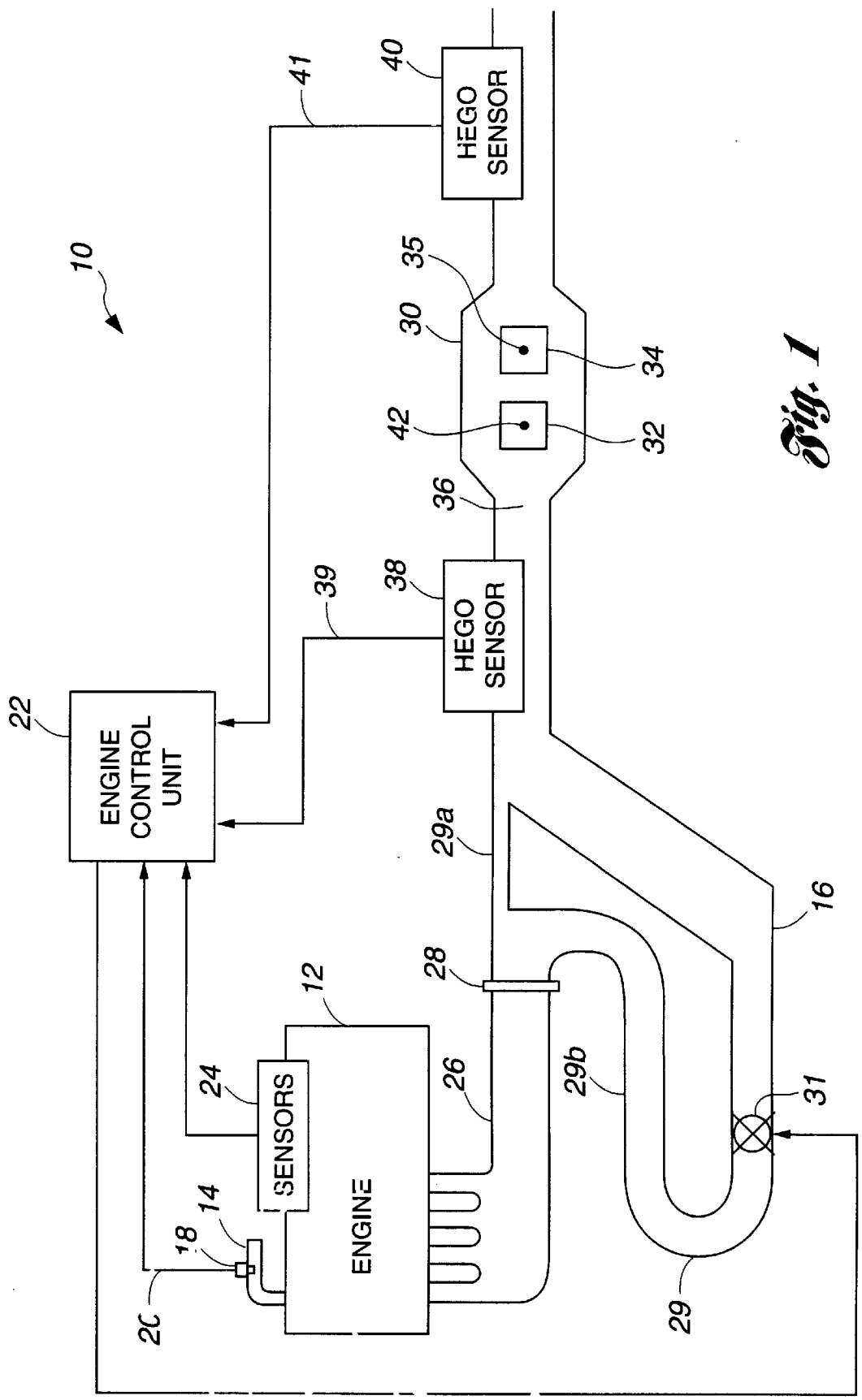
FIG. 1 is a schematic diagram of an engine and control system in accordance with an embodiment of this invention.

Turning now to FIG. 1, there is shown a schematic diagram of the system of the present invention, denoted generally by reference numeral 10. The system 10 includes an internal combustion engine 12 having an intake manifold 14 and an exhaust system 16. Positioned in the intake manifold 14 is a conventional mass air flow sensor 18 for detecting the amount of air inducted into the engine 12 and generating a corresponding air flow signal 20 for receipt by an Engine Control Unit (ECU) 22. The air flow signal 20 is utilized by the ECU 22 to calculate a value termed air mass (AM) which is indicative of a mass of air flowing into the induction system in lbs/min. Alternatively, a conventional manifold absolute pressure sensor (MAPS) may be used to calculate the AM. The air flow signal 20 is also used to calculate a value termed air charge (AIRCHG) which is indicative of air mass per cylinder filling, in units of lbs. per cylinder filling where a cylinder filling occurs once for each cylinder of the engine upon every two engine revolutions for a four-stroke engine. In another embodiment utilizing a two-stroke engine a cylinder filling occurs for each cylinder of the engine 12 upon every engine revolution.

The system 10 further includes other sensors, indicated generally at 24, for providing additional information about engine performance to the ECU 22, such as crankshaft position, angular velocity, throttle position, air temperature, engine coolant temperature, etc. The information from these sensors is used by the ECU 22 to control operation of the engine 12.

Figure 2:
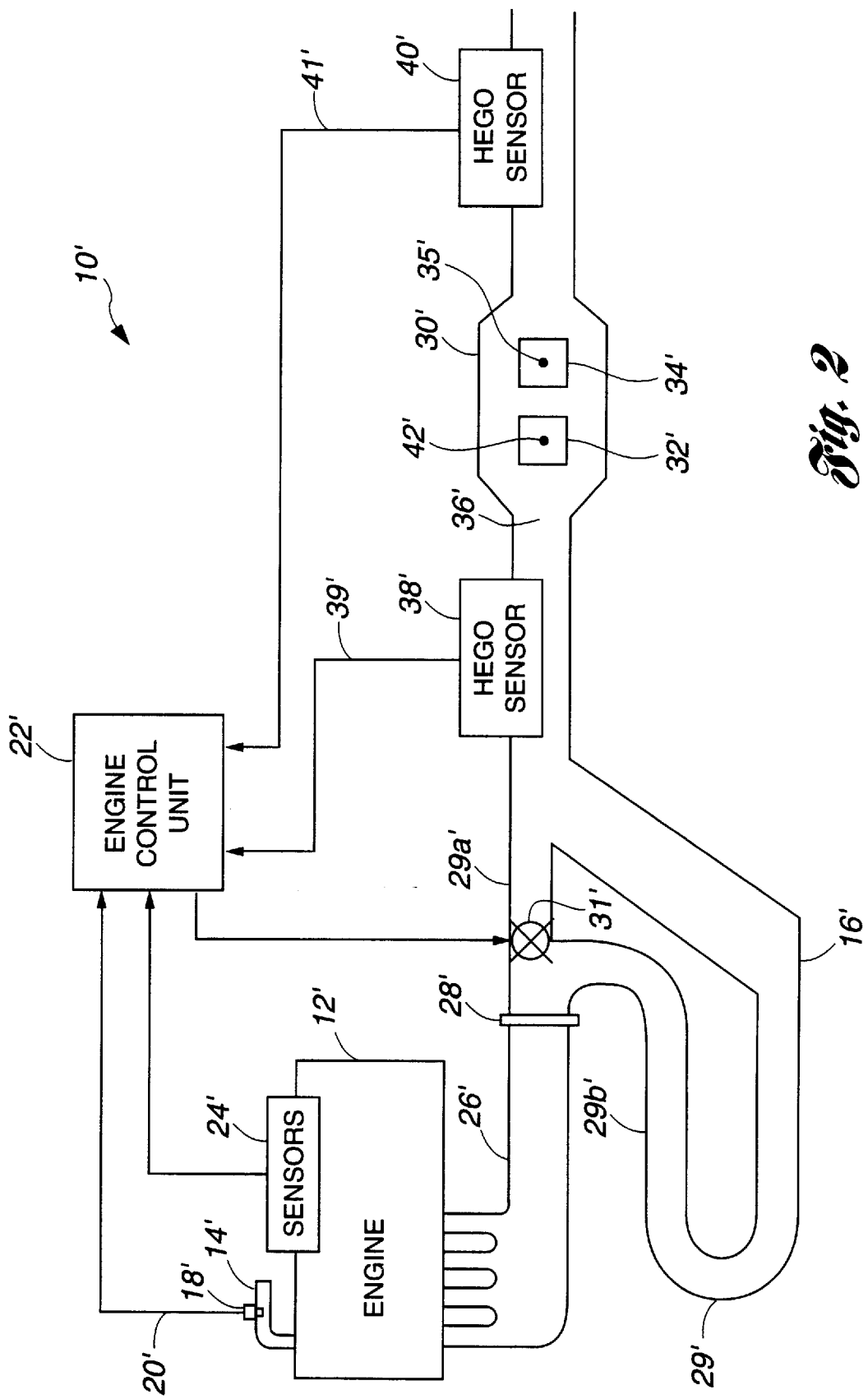
FIG. 2 is a schematic diagram of a second embodiment of the invention shown in FIG. 1.

The exhaust system 16 comprises an exhaust manifold 26, an exhaust flange 28, and a variable length exhaust pipe 29 which provides two paths 29a, 29b for exhaust gas flow. In the first embodiment, the short path 29a is always open. The long path 29b includes an Electronic Exhaust Length Control Valve (EELCV) 31 which is controlled by the ECU 22. At high air mass flow, the majority of exhaust gas flows through the path of least resistance, which is the larger diameter long path. An alternative embodiment is shown in FIG. 2 in which the EELCV 31' is positioned so that it positively closes the short path 29a' when the long path 29b' is open. The embodiment shown in FIG. 1 may be preferred since the EELCV 31 is not positioned where it may be subjected to hot temperatures.

The exhaust system 16 transports exhaust gas produced from combustion of an air/fuel mixture in the engine 12 to an integrated three-way catalytic converter/nitrogen oxide ($NO_x$) trap canister 30. The canister 30 contains a catalyst substrate 32 which receives the exhaust gas produced by the engine 12 via an inlet 36 and then chemically alters the exhaust gas to generate an inert catalyzed exhaust gas. The canister 30 also contains a $NO_x$ trap substrate 34 for trapping $NO_x$ emitted by the engine 12. Alternatively, the $NO_x$ trap may be a separate canister (not shown) from the catalytic canister.

An upstream heated exhaust gas oxygen (HEGO) sensor 38, positioned upstream of the canister 30 on the exhaust system 16 of the engine 12, detects the oxygen content of the exhaust gas generated by the engine 12 and transmits a representative signal 39 to the ECU 22. A downstream HEGO sensor 40, positioned downstream of the canister 30, detects the oxygen content of the catalyzed exhaust gas and transmits a representative signal 41 to the ECU 22. Associated with each sensor 38 and 40 is a resistance heater for providing selective heating of sensors 38 and 40.

Typically, the catalyst substrate 32 of the catalytic converter 30 experiences degradation when operated at a temperature greater than approximately 1800 degrees fahrenheit. A temperature at a midbed point, shown at 42, of the catalyst 32 is representative of the temperature of the catalyst 32 in the canister 30. The midbed point 42 is preferably located one inch from the initial point of contact of exhaust gas on the catalyst 32, at the axial centerline of the catalyst 32. Furthermore, a temperature at a midbed point 35 of $NO_x$ trap 34 is representative of the temperature of the $NO_x$ trap 34.

Figure 3:
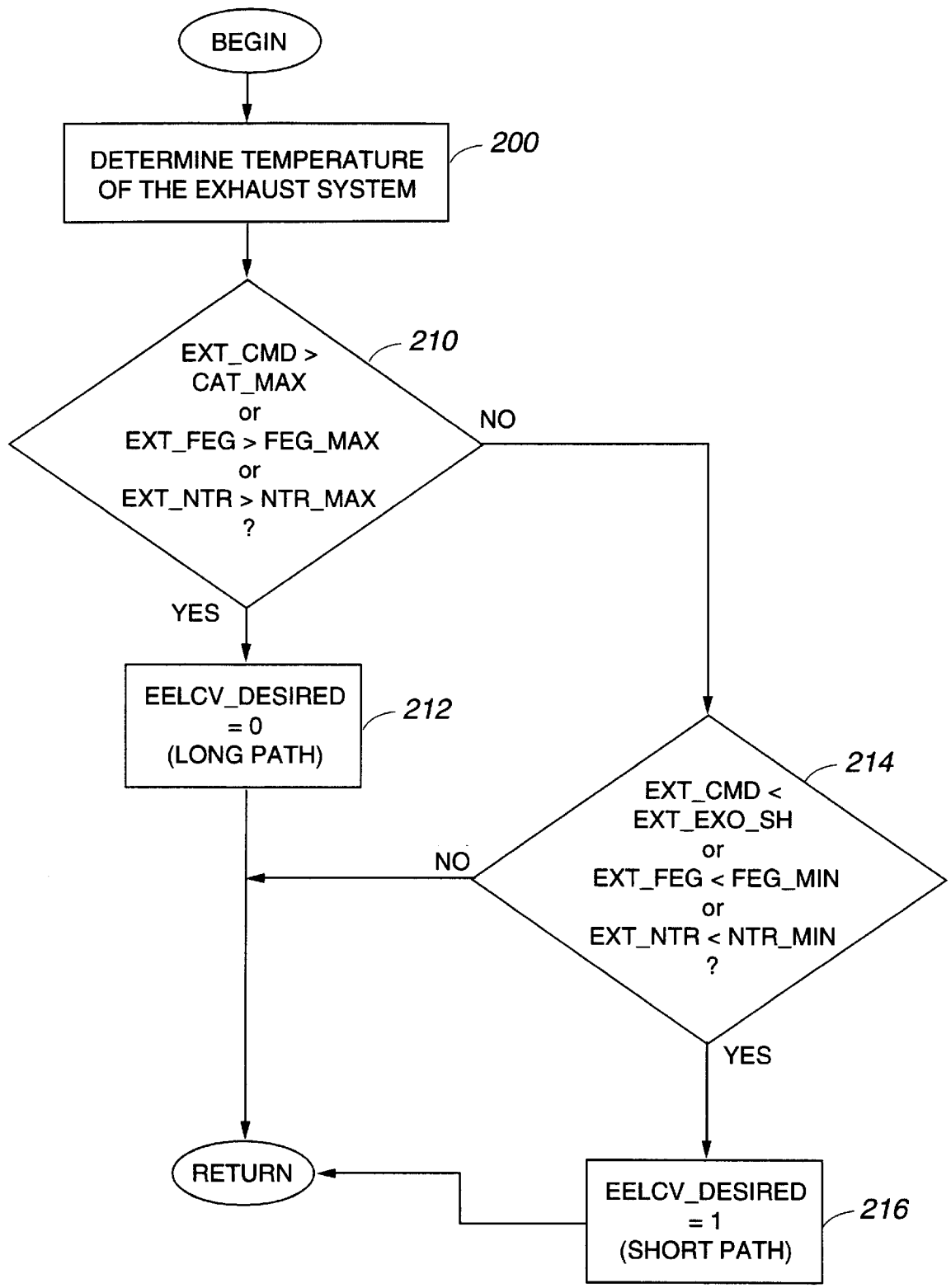
FIGS. 3 and 4 are flow diagrams illustrating the general sequence of steps associated with the method of the present invention.
Figure 4:
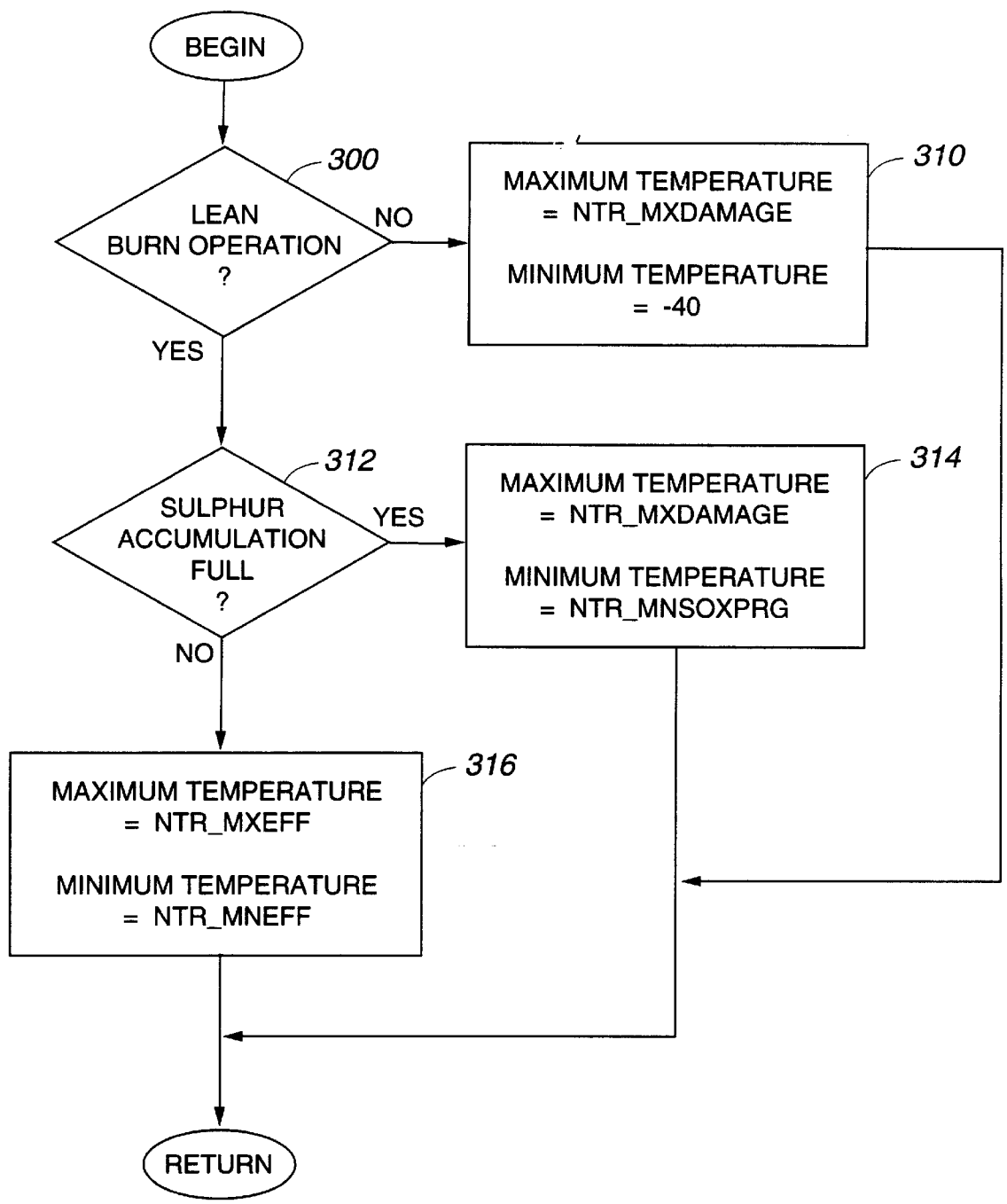

Turning now to FIGS. 3 and 4, there are shown flow diagrams illustrating the general sequence of steps associated with determining which exhaust path is desired based on a comparison between the instantaneous temperature of various exhaust components and the temperature limits for each of the various exhaust components. The steps are performed by a control logic, or the ECU 22. The ECU 22 may be comprised of hardware, software, or a combination thereof. Although the steps shown in FIGS. 3 and 4 are depicted sequentially, they can be implemented utilizing interrupt-driven programming strategies, object-oriented programming, or the like. In a preferred embodiment, the steps shown in FIGS. 3 and 4 comprise a portion of a larger routine which performs other engine control functions.

The method begins with the step of determining the temperatures representative of the exhaust system, as shown at block 200. The exhaust system temperatures include the catalyst midbed temperature 42, the $NO_x$ trap midbed temperature 35, and the temperature of the front HEGO sensor 38. The midbed temperature 42 of the catalyst 32 may be sensed directly utilizing a sensor (not shown) or inferred. Several known methods provide for a method of inferring or estimating the midbed temperature of the catalyst 32. Preferably, the midbed temperature of the catalyst 32 is determined according to the method disclosed in U.S. Pat. No. 5,832,721 entitled "Method And System For Estimating A Midbed Temperature Of A Catalytic Converter In An Exhaust System Having A Variable Length Exhaust Pipe."

The temperature of the front HEGO sensor 38 may also be sensed directly utilizing a sensor (not shown) or inferred. Preferably, the temperature of the front HEGO sensor 38 is determined in a manner according to the method disclosed in U.S. Pat. No. 5,605,040 entitled, "Inferring Temperature Of A Heated Exhaust Gas Oxygen Sensor.

The desired operating temperatures of the $NO_x$ trap 34 are determined based on current engine conditions. FIG. 4 illustrates the sequence of steps associated with determining the desired temperature limits of the $NO_x$ trap 34. First, it is determined whether the engine is running in lean burn operation, as shown at conditional block 300. This is determined based on the status of a flag variable stored in memory of the ECU 22. If the engine is not running lean, the exhaust system only needs to be protected against overtemperature damage. Therefore, the maximum desired temperature of the $NO_x$ trap 34 (ntr_max) is set equal to the maximum temperature (NTR_MXDAMAGE) (in degrees Fahrenheit) at which the $NO_x$ trap 34 can operate without experiencing damage, as shown at block 310. This limit is preferably equal to 1600 degrees Fahrenheit. The minimum desired temperature of the $NO_x$ trap 34 is set to a small nominal value so that this limit is essentially ignored, such as −40 degrees Fahrenheit.

Returning to block 300, if the engine is in lean burn operation, a determination is made as to whether an accumulation of sulphur has reached its limit, as shown at conditional block 312. Any known conventional method for determining the level of sulphur accumulation in an exhaust system can be utilized in the present invention. If the amount of sulphur accumulation has reached its limit, ntr_max is set equal to NTR_MXDAMAGE, as shown at block 314. The minimum desired temperature, ntr_min, is set equal to the minimum temperature at which sulphur can be purged from the exhaust system into atmosphere. Preferably, this value is equal to 1500 degrees Fahrenheit.

If the accumulation of sulphur has not reached its limit, thus not requiring certain conditions in order to purge into the atmosphere, ntr_max is set equal to a value representing the maximum temperature, NTR_MXEFF, at which the $NO_x$ trap 34 can operate at peak efficiency, as shown at block 316. The ntr_min is set equal to NTR_MNEFF, a value representing the minimum temperature at which the $NO_x$ trap 34 can operate and still achieve peak efficiency. These values are preferably 1500 degrees Fahrenheit and 1000 degrees Fahrenheit, respectively.

Returning to block 200 of FIG. 3, these temperatures are first compared to their corresponding maximum temperatures as shown at block 210. The midbed temperature of the catalyst 32, EXT_CMD, is compared to a maximum catalyst safe operating temperature, CAT_MAX, e.g., 1600 degrees Fahrenheit. At the same time, the temperature of the front HEGO sensor 38, EXT_FEG, is compared to a maximum HEGO operating temperature, FEG_MAX, e.g., 1200 degrees Fahrenheit. Finally, the temperature of the $NO_x$ trap 34, EXT_NTR, is compared to the desired maximum operating temperature previously determined.

If any of the temperatures exceed their respective maximum operating temperatures, an EELCV_Desired flag is set at block 212 to a value, such as 0, indicating that the long exhaust path 29b is desired in order to allow the exhaust gas to cool before it reaches the front HEGO 38, the catalyst 32 and the $NO_x$ trap 34. The EELCV_Desired flag is initially set to direct the flow of exhaust gas through the short path 29a, and is then set by the ECU 22 after going through the routine of the present invention.

If none of the temperatures exceed their respective maximum operating temperatures, the temperatures are then compared to minimum operating temperatures, as shown at block 214. The EXT_CMD is compared to a minimum operating temperature, EXT_EXO_SH, such as 600 degrees Fahrenheit, EXT_FEG is compared to a minimum operating temperature, FEG_MIN, such as 600 degrees Fahrenheit, and EXT_NTR is compared to a minimum operating temperature, ntr_min, as described above. If none of these temperatures are below the minimum operating temperature, no action is taken and the EELCV_Desired flag is left in its previous state. On the other hand, if any of these temperatures are less than their respective minimum operating temperatures, the EELCV_Desired flag is set to "1" indicating that the short path 29a is desired in order to heat up the exhaust system components, as shown at block 216.

While the best modes for carrying out the invention have been described in detail, those familiar with the art to which this invention relates will recognize various alternative designs and embodiments for practicing the invention as defined by the following claims.

What is claimed is:

1. A method for controlling the temperature of an exhaust system of an internal combustion engine, the exhaust system having a variable length exhaust pipe including a short path and a long path, the exhaust system further having an exhaust valve positioned in the exhaust pipe for regulating the flow of exhaust gas between the short path and the long path, the method comprising:

estimating a plurality of exhaust temperatures at various locations on the exhaust system;

determining a plurality of maximum temperatures;

comparing the plurality of estimated exhaust temperatures with the plurality of maximum temperatures; and if a preselected number of the plurality of estimated exhaust temperatures exceed the plurality of maximum temperatures, controlling the exhaust valve so that the exhaust gas flows through the long path of the exhaust pipe so as to aid in cooling the exhaust gas.

2. The method as recited in claim 1 further comprising:

determining a plurality of minimum temperatures;

comparing the plurality of estimated exhaust temperatures with the plurality of minimum temperatures; and if a preselected number of the plurality of estimated exhaust temperatures are less than the plurality of minimum temperatures, controlling the exhaust valve so that the exhaust gas flows through the short path of the exhaust pipe.

3. The method as recited in claim 2 wherein the exhaust system includes a front exhaust gas oxygen (EGO) sensor positioned between an exhaust flange of the exhaust pipe and a catalytic converter, the catalytic converter including a catalyst having a midbed point and a nitrogen oxide trap, and wherein estimating the plurality of exhaust temperatures comprises:

estimating a temperature of the front EGO;

estimating a temperature of the midbed point of the catalyst; and estimating a temperature of the nitrogen oxide trap.

4. The method as recited in claim 3 wherein determining the plurality of maximum temperatures includes determining a maximum safe operating temperature of the nitrogen oxide trap when the engine is in a lean burn operation and wherein determining the plurality of minimum temperatures includes determining a minimum operating temperature of the nitrogen oxide trap when the engine is in a lean burn operation.

5. The method as recited in claim 3 wherein determining the plurality of maximum and minimum temperatures further includes determining if the exhaust system has accumulated a maximum amount of sulphur.

6. The method as recited in claim 4 wherein determining the plurality of maximum temperatures includes determining a maximum safe operating temperature of the nitrogen oxide trap if the exhaust system has accumulated a maximum amount of sulphur and wherein determining the plurality of minimum temperatures includes determining a minimum temperature at which the accumulation of sulphur can be purged if the exhaust system has accumulated a maximum amount of sulphur.

7. The method as recited in claim 6 wherein determining the plurality of maximum temperatures includes determining a maximum temperature for operating the nitrogen oxide trap at peak efficiency if the exhaust system has not accumulated a maximum amount of sulphur and wherein determining the plurality of minimum temperatures includes determining a minimum temperature for operating the nitrogen oxide trap at peak efficiency if the exhaust system has not accumulated a maximum amount of sulphur.

8. A system for controlling the temperature of an exhaust system of an internal combustion engine, the exhaust system having a variable length exhaust pipe including a short path and a long path, the exhaust system further having an exhaust valve positioned in the exhaust pipe for regulating the flow of exhaust gas between the short path and the long path, the system comprising:

control logic operative to estimate a plurality of exhaust temperatures at various locations on the exhaust system, determine a plurality of maximum temperatures, compare the plurality of estimated exhaust temperatures with the plurality of maximum temperatures, and to control the exhaust valve so that the exhaust gas flows through the long path of the exhaust pipe if a preselected number of the plurality of estimated exhaust temperatures exceed the plurality of maximum temperatures so as to aid in cooling the exhaust gas.

9. The system as recited in claim 8 wherein the control logic is further operative to determine a plurality of minimum temperatures, compare the plurality of estimated exhaust temperatures with the plurality of minimum temperatures, and control the exhaust valve so that the exhaust gas flows through the short path of the exhaust pipe if a preselected number of the plurality of estimated exhaust temperatures are less than the plurality of minimum temperatures.

10. The system as recited in claim 9 wherein the exhaust system includes a front exhaust gas oxygen (EGO) sensor positioned between an exhaust flange of the exhaust pipe and a catalytic converter, the catalytic converter including a catalyst having a midbed point and a nitrogen oxide trap, and wherein the control logic, in estimating the plurality of exhaust temperatures, estimates a temperature of the front EGO, a temperature of the midbed point of the catalyst, and a temperature of the nitrogen oxide trap.

11. The system as recited in claim 10 wherein the control logic, in determining the plurality of maximum temperatures, determines a maximum safe operating temperature of the nitrogen oxide trap when the engine is in a lean burn operation and, in determining the plurality of minimum temperatures, determines a minimum operating temperature of the nitrogen oxide trap when the engine is in a lean burn operation.

12. The system as recited in claim 10 wherein the control logic, in determining the plurality of maximum and minimum temperatures, determines if the exhaust system has accumulated a maximum amount of sulphur.

13. The system as recited in claim 11 wherein the control logic, in determining the plurality of maximum temperatures, determines a maximum safe operating temperature of the nitrogen oxide trap if the exhaust system has accumulated a maximum amount of sulphur and, in determining the plurality of minimum temperatures, determines a minimum temperature at which the accumulation of sulphur can be purged if the exhaust system has accumulated a maximum amount of sulphur.

14. The system as recited in claim 13 wherein the control logic, in determining the plurality of maximum temperatures, determines a maximum temperature for operating the nitrogen oxide trap at peak efficiency if the exhaust system has not accumulated a maximum amount of sulphur and, in determining the plurality of minimum temperatures, determines a minimum temperature for operating the nitrogen oxide trap at peak efficiency if the exhaust system has not accumulated a maximum amount of sulphur.

15. An article of manufacture for an exhaust system of an internal combustion engine, the exhaust system having a variable length exhaust pipe including a short path and a long path, the exhaust system further having an exhaust valve positioned in the exhaust pipe for regulating the flow of exhaust gas between the short path and the long path, the article of manufacture comprising:

a computer storage medium having a computer program encoded therein for estimating a plurality of exhaust temperatures at various locations on the exhaust system, determining a plurality of maximum temperatures, comparing the plurality of estimated exhaust temperatures with the plurality of maximum temperatures, and controlling the exhaust valve so that the exhaust gas flows through the long path of the exhaust pipe if a preselected number of the plurality of exhaust temperatures exceed the plurality of maximum temperatures so as to aid in cooling the exhaust gas.

16. The article of manufacture as recited in claim 15 wherein the computer program is further encoded therein for determining a plurality of minimum temperatures, comparing the plurality of estimated exhaust temperatures with the plurality of minimum temperatures, and controlling the exhaust valve so that the exhaust gas flows through the short path of the exhaust pipe if a preselected number of the plurality of exhaust temperatures are less than the plurality of minimum temperatures.

* * * * *